(12) United States Patent
Tilley et al.

(10) Patent No.: US 9,005,793 B2
(45) Date of Patent: Apr. 14, 2015

(54) ENERGY STORAGE ARTICLE AND METHOD

(71) Applicant: General Electric Company, Schenectady, NY (US)

(72) Inventors: Alec Roger Tilley, Ashbourne (GB); Hiroshi Ohata, Kitakysuhu (JP); Koichi Kanie, Kitakyushu (JP)

(73) Assignee: General Electric Company, Schenectady, NY (US)

(*) Notice: Subject to any disclaimer, the term of this patent is extended or adjusted under 35 U.S.C. 154(b) by 149 days.

(21) Appl. No.: 13/692,087

(22) Filed: Dec. 3, 2012

(65) Prior Publication Data

US 2013/0316197 A1   Nov. 28, 2013

Related U.S. Application Data

(60) Provisional application No. 61/650,890, filed on May 23, 2012.

(51) Int. Cl.
| H01M 10/39 | (2006.01) |
| H01M 2/38 | (2006.01) |
| H01G 11/14 | (2013.01) |
| H01G 11/82 | (2013.01) |
| H01G 11/54 | (2013.01) |

(52) U.S. Cl.
CPC ............ *H01M 2/38* (2013.01); *H01M 10/39* (2013.01); *H01G 11/14* (2013.01); *H01G 11/82* (2013.01); *H01G 11/54* (2013.01)

(58) Field of Classification Search
CPC ...... H01M 10/39–10/399; H01G 11/00–11/86
See application file for complete search history.

(56) References Cited

U.S. PATENT DOCUMENTS

| 5,158,839 | A | * | 10/1992 | Wright | 429/103 |
| 5,164,272 | A | * | 11/1992 | Lowton et al. | 429/104 |
| 5,219,682 | A | * | 6/1993 | Bones et al. | 429/320 |
| 5,230,968 | A | * | 7/1993 | Bones et al. | 429/139 |
| 5,472,806 | A | * | 12/1995 | Meintjes | 429/165 |
| 5,573,871 | A | * | 11/1996 | Von Benda | 429/103 |
| 5,763,117 | A | | 6/1998 | Wright et al. | |
| 6,239,350 | B1 | * | 5/2001 | Sievers et al. | 136/205 |
| 2009/0233170 | A1 | * | 9/2009 | Iacovangelo et al. | 429/203 |
| 2010/0178546 | A1 | * | 7/2010 | Rijssenbeek et al. | 429/131 |
| 2011/0050235 | A1 | * | 3/2011 | Bogdan et al. | 324/426 |
| 2011/0206984 | A1 | * | 8/2011 | Yerramalli et al. | 429/185 |
| 2013/0004828 | A1 | * | 1/2013 | Zappi et al. | 429/149 |
| 2013/0309544 | A1 | * | 11/2013 | Zappi et al. | 429/120 |

FOREIGN PATENT DOCUMENTS

| GB | 1461071 | 1/1977 |
| GB | 1461072 | 1/1977 |

* cited by examiner

*Primary Examiner* — Ula C Ruddock
*Assistant Examiner* — Scott J Chmielecki
(74) *Attorney, Agent, or Firm* — Dority & Manning, P.A.

(57) ABSTRACT

Systems and methods for obtaining and/or maintaining a column height of an electrolyte relative to a separator surface within an energy storage device. Embodiments of the invention provide a wicking component, a current collector, and a bias component. The current collector is positioned to force the bias component to press the wicking component tight to an inner surface of a separator. The bias component maintains contact between the wicking component and the surface of separator and creates a capillary gap in which sodium wicks.

19 Claims, 2 Drawing Sheets

ENERGY STORAGE ARTICLE AND METHOD

CROSS REFERENCE TO RELATED APPLICATIONS

This application claims the benefit of U.S. Provisional Application Ser. No. 61/650,890, filed May 23, 2012, and entitled "ENERGY STORAGE CELL AND METHOD OF ASSEMBLY." The entirety of the aforementioned application is incorporated herein by reference.

BACKGROUND

1. Technical Field

Embodiments of the subject matter disclosed herein relate to an energy storage device. More particularly, the invention includes embodiments that relate to an energy storage device that includes a bias component to maintain contact between a separator and a metal wicking component.

2. Discussion of Art

Metal chloride batteries with molten sodium anode and beta-alumina solid electrolyte are employed for energy storage applications. Energy storage devices may include a sodium negative (anode) electrode separated from the positive (cathode) electrode by a sodium ion conducting ceramic beta-alumina structure or material (e.g., a separator). A metal component is used to facilitate wicking of sodium on an inner surface of the separator. The separator can be fabricated from a fired ceramic material that is not a perfect geometric shape (e.g., longitudinal wave, longitudinal curves, and the like). Deviating from perfection may reduce the metal component to separator surface contact area. A decreased contact area may deteriorate wicking capabilities.

It may be desirable to have an energy storage device and method that differs from those that are currently available.

BRIEF DESCRIPTION

In one embodiment, an energy storage article is provided that includes an electrically insulative, ionically conductive separator having an inner surface defining a volume; a wicking component having an inner surface and an outer surface, and the outer surface contacting the inner surface of separator; and a bias component having an inner surface and an outer surface, the outer surface contacting the inner surface of the wicking component, wherein the bias component urges the wicking component against the separator inner surface such that a capillary gap is maintained between the wicking component outer surface and the separator inner surface.

In one embodiment, a system is provided that includes an ionically conductive, electrically insulative separator having an inner surface defining a volume, and the volume is configured to receive liquid electrolyte at a determined state of charge; a wicking component in capillary contact with the separator inner surface such that a capillary gap is defined between a surface of the wicking component and at least a portion of the inner surface of the separator; a bias component configured to urge the wicking component against the separator inner surface at a plurality of contact points with a determined amount of force such that the capillary gap is obtained and maintained at a determined gap distance and with a determined gap distance uniformity; and a current collector in contact with the bias component to support the bias component.

A method is provided that includes responding to a charging level above a defined state of charge level in an electrochemical cell by changing a shape of a current collector to reduce a pressure that is internal to the electrochemical cell but external to the current collector.

BRIEF DESCRIPTION OF THE DRAWINGS

Reference is made to the accompanying drawings in which particular embodiments and aspects of the invention are illustrated as described in more detail in the description below, in which.

DETAILED DESCRIPTION

Embodiments of the subject matter disclosed herein relate to an energy storage device. A system and method for maintaining an electrolyte level relative to a separator surface within an energy storage device are disclosed. These energy storage devices may include a bias component that works cooperatively with a wicking component to maintain contact/spacing between the separator and the wicking component.

As used herein, the term "device" is inclusive of the term "cell", and a cell is the smallest complete electrochemical element. The term "reservoir" is used herein to refer to a region defined at least in part by a current collector. "Operative communication" means that material disposed in one region may transgress into another region. The term "corrugated" as used herein can be defined as a series of parallel ridges and furrows.

Figure 1:
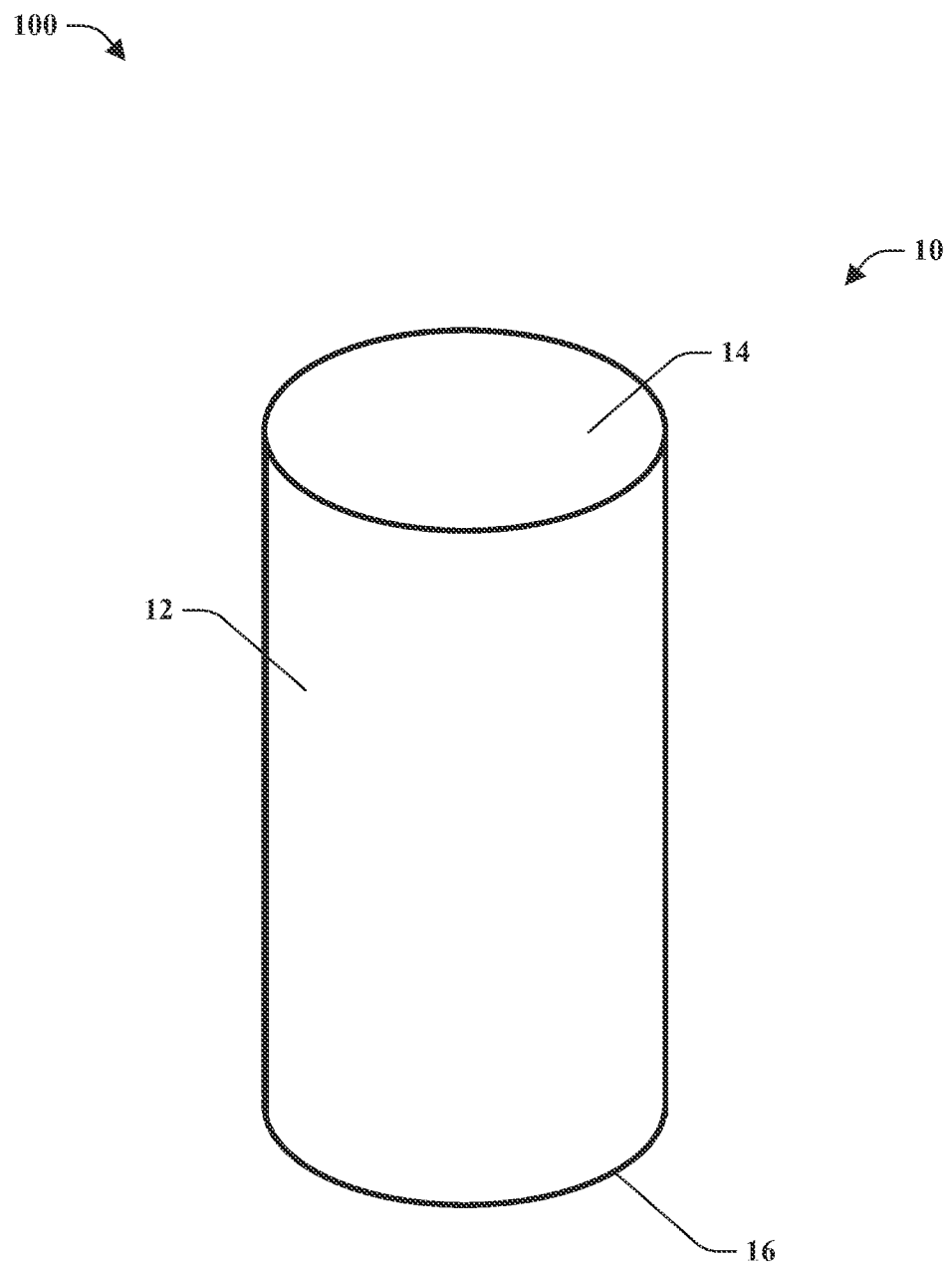
FIG. 1 is a schematic perspective view of an electrochemical device according to an embodiment of the invention.

With reference to FIG. 1, a system 100 illustrates a perspective view of a generally cylindrical energy storage device 10 including aspects of the invention is shown. A housing 12 encases the other components. The bias component (not shown) may be positioned to force the wicking component (not shown) against an inner surface of the separator within the energy storage device. The force from the bias component ensures the wicking component is urged or pressed against separator surface. The bias component presses the wicking component against the inner surface of separator ensuring it is a determined fit to provide a functional capillary gap. A capillary gap between the wicking component and the inner surface of separator facilitates electrolyte wicking. For directional reference, up is indicated with reference number 14, while the bottom is indicated by reference number 16.

Figure 2:
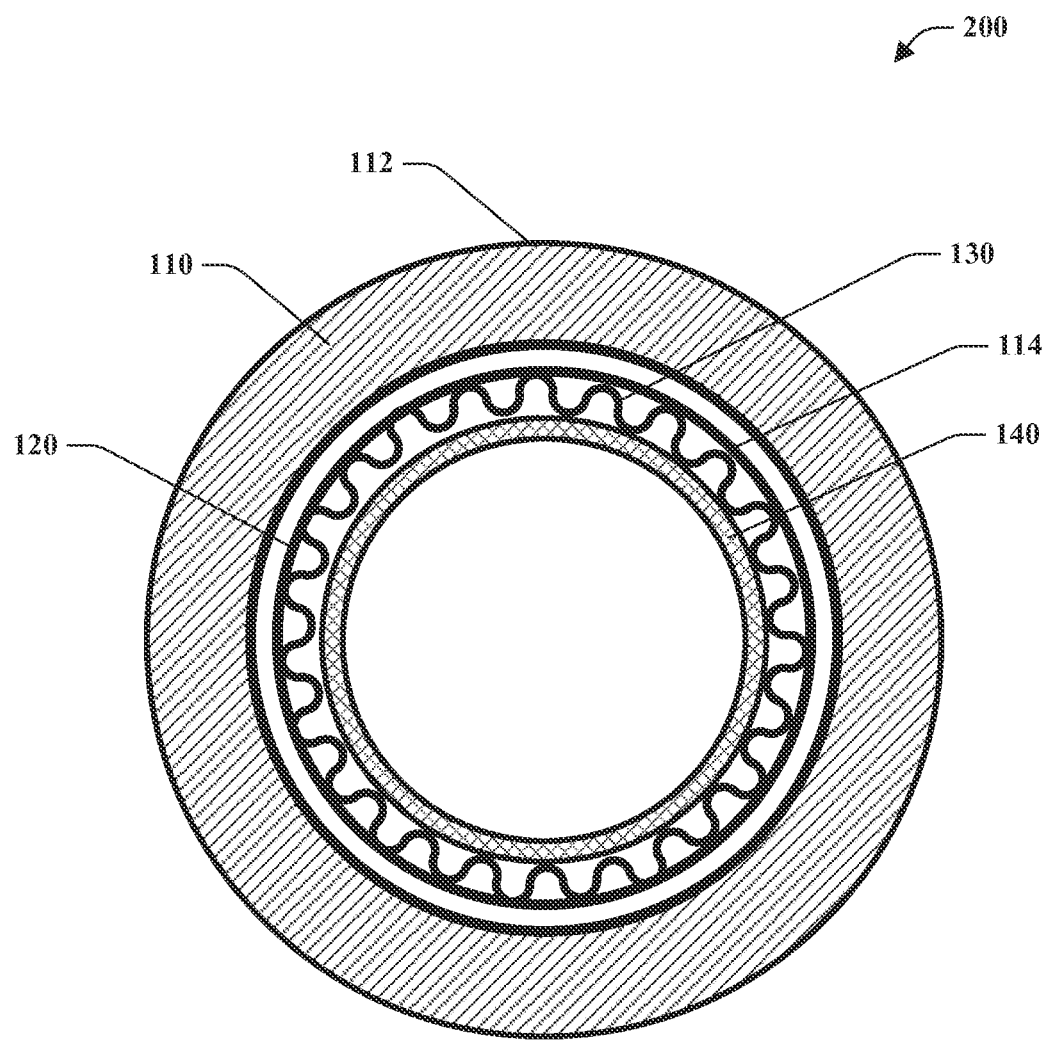
FIG. 2 is a cross-sectional view of the device shown in FIG. 1.

With reference to FIG. 2, a cross-sectional view 200 along the length of an energy storage device in accordance with an embodiment of the invention is provided. The device includes a separator 110. The separator is a cylindrical tube having a diameter less than that of housing and having an outer surface 112 and an inner surface 114. In addition to the separator, a wicking component 120, a bias component 130, and a current collector 140 are disposed within the interior of the separator defined by the inner surface. The separator is disposed concentrically and coaxially in the housing volume.

Separator

The separator provides a path for ion transfer between a cathode and an anode region during use. The ions may be alkali metal ions. Suitable alkali metals include, e.g., sodium and lithium. The separator may conduct ions at operational conditions. Operational conditions may be determined on specific factors, but where an exemplary electrolyte may be sodium, the operating pressure may be in excess of ambient pressure and the temperature may be greater than about 150 degrees Celsius. Suitable separators may be formed from beta double prime alumina. Regarding its shape, a suitable separator can be a tube or like hollow cross-sectional profile.

The inner surface of the separator may be polished to reduce irregularities. However, the gap between the wicking component and the separator inner surface may be maintained within a determined range to facilitate wicking. An overly small gap may prevent wicking flow, and overly large gap may prevent or reduce the wicking effect. Further, a non-uniform gap may cause areas that are "dry" or devoid of liquid electrolyte.

Gap spacer materials may be used to enhance the surface area available for wicking and to enhance the surface area and the sodium-philicity of the surface. These may include carbon materials, such as carbon particle paint, carbon felt, carbon mesh, and the like. Other non-carbon materials may be used based on their properties.

Suitable capillary gap spacing may be selected based on application specific parameters. In one embodiment, the gap may be less than about 0.10 mm, in a range of from about 0.11 mm to about 0.15 mm, from about 0.16 mm to about 0.20 mm, from about 0.21 mm to about 0.25 mm, from about 0.26 mm to about 0.30 mm, or greater than 0.3 mm. In the illustrated embodiment, the gap may have an average distance of 0.22 mm. In addition to the gap average distance, the uniformity of the gap may have a deviation of less than 0.05 mm, or less than 0.01 mm.

Wicking Component

The wicking component provides sodium wicking to keep the beta alumina surface covered or wetted. The wicking action can be by capillary gap between the wicking component and the beta alumina surface. This gap ensures the sodium can be wicked up the height of the cell ~30 cm. To keep or maintain the gap, the bias component presses the wicking component tightly against the beta alumina surface. The bias component is a tight fit between the current collector and the wicking component that is pressed against the beta alumina surface. It is a springy and a tight fit because the beta alumina is a fired object (e.g., not a perfect shape) and the bias component makes the wicking component fit the separator well. The wicking component may be maintained in close contact with the separator by the bias component and the current collector.

The separator contacting surface of the wicking component may be surface treated, such as polished or ground, to achieve a determined surface profile. Further, surface treatments may include scoring, patterning, and coating to control the surface area and to enhance the sodium-philicity of the wicking component. Suitable patterning may be done by, for example, laser etching, sonic etching, scarification, and the like.

The wicking component may extend across the available surface area of the separator. Treatment of the bottom of the wicking component may facilitate feeding the wicking component sodium from the interior of the cell. In one embodiment, the wicking component may have a thickness that is less than approximately 0.1 mm, in a range of from about 0.1 mm to about 0.15 mm, or greater than about 0.15 mm.

By way of example and not limitation, the bias component can be tubular and include at least one ridge and at least one furrow. In the embodiment illustrated in FIG. 2, the undulate bias component is bent into a tubular configuration. The bias component may be open along an edge (in "c" shape) or may be closed (in "o" shape). The contact points provided by the ridges firmly and evenly press the wicking component against the separator. The more contact points, the more evenly spread is the pressure supplied by the bias component. In the embodiment shown, the bias component is sandwiched against the current collector and the wicking component. The volume inside the current collector may be open, partially closed, or completely closed off from the sodium that fills the spaces between the bias component ridges and furrows.

Regarding alternative embodiments of the bias component, the bias component extends as fins from weld lines on the current collector out to the wicking component. Conversely, another embodiment includes fins welded to the inward facing surface of the wicking component to contact and press against the centrally located current collector. Other spring-like orientations may be possible that provide a bias of the wicking component against the separator, for example, by pushing against the current collector.

The bias component and the wicking component may be formed from the same or different materials relative to each other. Suitable materials include metals, ceramics, and cermets. Suitable metals may include steel, nickel, aluminum, alloys thereof, and the like.

Referring again to FIG. 2, the current collector can collect current, support the bias component, and/or displace volume so the sodium height in the separator ensures the wicking component is supplied with liquid sodium. The current collector size can be selected based on application specific parameters. For instance, the current collector can be manufactured as large as practically possible to accommodate disposition of the current collector into the separator with the bias component. In another example, the current collector can be as large as possible to displace volume in the separator to ensure the sodium is at a high as possible level even at low discharge states. The electrical current path is through the sodium to the current collector that is the negative terminal. For instance, approximately 40 cubic centimeters (cc) of sodium can be generated for cells above a nameplate capacity of approximately 150 Amp-hours (Ah). This can represent a column height of sodium of around approximately 16 millimeters (mm) in an embodiment where the separator has approximately 60 mm outside diameter (OD) and approximately 57 mm inside diameter (ID). At full charge the height of sodium column can be approximately 74 mm from the bottom.

At top of charge, the sodium column height is to near the top, but at bottom of discharge the sodium is at a relatively lower column height. The column height affects the wicking capability. In one embodiment, to reduce the chance of, or prevent, overpressure, the current collector may not define a sealed volume or a solid form. Reducing overpressure may be desirable to avoid, reduce or prevent damage (e.g., gross overcharge can cause a separator to burst). Again, the current collector may be hollow, and define an aperture to allow a flow of sodium into a space inside the current collector. By doing this, the current collector can both maximize the displacing volume so the sodium level can be as high as possible to facilitate wicking during use, and can provide that same displaced volume as sodium storage in the event of an overcharge.

The free space may be provided inside a current collector with a defined inner volume and defining an aperture, or multiple apertures, that extend through the current collector at or near the top of the separator. On overcharge, the sodium can flow into the current collector and thereby reduce the pressure buildup. The apertures may be located such that the sodium can wick as high as possible against the separator to improve (lower) the resistance path.

An alternative way to provide free volume may include having crush zones on the current collector. Thus, an accordion or corrugated shape may allow for the current collector to respond to increasing external pressure by partially collapsing to alleviate the pressure. It may be desirable to use materials such that pressure relief through discharge may allow the current collector to resume its pre-collapsed shape and orientation. Such materials may include thermal memory metals, bimetallic alloys, or spring-like materials. In an embodiment, the current collector has an inner surface that defines a space, and the current collector is responsive to an external pressure above a threshold value to change shape to decrease the space and therefore relieve the external pressure within the separator volume. In another embodiment, the current collector is capable of returning automatically to a pre-changed configuration in response to a decrease in the external pressure subsequent to having changed shape.

During use, the wicking component is forced (e.g., pressed, biased) outward to contact a surface of the separator in which the outward force is from the current collector and the bias component. It occurs because of inter-molecular attractive forces between the liquid and solid surrounding surfaces. The combination of surface tension (which is caused by cohesion within the liquid) and adhesive forces between the liquid and container act to lift the liquid if the capillary gap sufficiently sized and uniform.

The anchoring force from the current collector coupled with the bias component ensures the wicking component is in constant contact with the separator and that the capillary gap is maintained in a determined manner. That is, the wicking component is in contact with the surface of the separator based upon the current collector and the bias component applying an outward force (e.g., pressing) to the wicking component against the separator. The bias component maintains contact between the wicking component and the separator, wherein such contact ensures a consistent capillary gap in which sodium can wick.

The bias component generates a force that maintains an outer surface of the wicking component is in contact with the inner surface of the separator. The bias component generates a force to press the inner surface of the wicking component outward and, in turn, the outer surface of the wicking component outward to press on to the inner surface of the separator.

During discharge, the current collector can ensure the sodium height is maintained at a determine height level relative to the separator in the cell. In another example, the apertures for ensuring there is no over pressure can be dispensed with by evacuated closure of the anode compartment but, without the apertures, an overcharge condition in which sodium could enter the current collector could not occur. The level of sodium can be adjusted. For instance, if the compartment is full of sodium to the top of the central metal tube then evacuation may not help but extra volume may help. A spare volume may be provided for the sodium metal to go, hence the employment of at least one aperture at the top. Evacuation is still possible and it can lower any gas pressure but volume for the excess sodium generated on gross overcharge is still needed.

The aforementioned systems, devices (e.g., energy storage device, article, among others), and the like have been described with respect to interaction between several components and/or elements. Such devices and elements can include those elements or sub-elements specified therein, some of the specified elements or sub-elements, and/or additional elements. Further yet, one or more elements and/or sub-elements may be combined into a single component to provide aggregate functionality.

During assembly, a wicking component is inserted into a separator. A bias component is inserted into the separator. A current collector is inserted into separator in which the current collector is inserted into the bias component. The current collector, the bias component, the wicking component, and separator may be then packaged into a housing. A method includes responding to a charging level above a defined state of charge level in an electrochemical cell by changing a shape of a current collector to reduce a pressure that is internal to the electrochemical cell but external to the current collector.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

In appended claims, the terms "including" and "having" are used as the plain language equivalents of the term "comprising"; the term "in which" is equivalent to "wherein." As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Certain embodiments may be shown as having like or similar elements, however, this is merely for illustration purposes, and such embodiments need not necessarily have the same elements unless specified in the claims.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not different from the literal language of the claims, or if they include equivalent structural elements with insubstantial differences from the literal language of the claims.

The invention claimed is:

1. An energy storage article, comprising:
   an electrically insulative, ionically conductive separator having an inner surface defining a volume;
   a wicking component having an inner surface and an outer surface, and the outer surface contacting the inner surface of separator; and
   a bias component having an inner surface and an outer surface, the outer surface contacting the inner surface of the wicking component, wherein the bias component urges the wicking component against the separator inner surface such that a capillary gap is maintained between the wicking component outer surface and the separator inner surface.

2. The article of claim 1, wherein the bias component maintains contact between the wicking component and the inner surface of separator to create the capillary gap that facilitates wicking of a portion of a fluid electrolyte to a top of the separator.

3. The article of claim 1, further comprising a current collector that contacts the inner surface of the bias component.

4. The article of claim 3, wherein the current collector has a diameter that is wide enough to cause a volume of the current collector to be greater than fifty percent of a volume defined by the inner surface of the separator.

5. The article of claim 4, wherein the current collector displaces sufficient volume to increase a column height of liquid electrolyte.

6. The article of claim 1, wherein the current collector has an inner surface that defines a space, and further defines an aperture that extends through the current collector so as to allow a flow of liquid therethrough.

7. The article of claim 6, wherein current collector is configured so that the space defined by the current collector inner surface receives a portion of liquid electrolyte when a determined volume of liquid electrolyte is achieved through a state of charge of the energy storage article.

8. The article of claim 7, wherein the aperture is one of a plurality of apertures disposed at a top of the current collector.

9. The article of claim 1, wherein the current collector is configured to crush in response to a determined amount of external pressure.

10. The article of claim 9, wherein the current collector comprises a material that responds to a decrease in external pressure, subsequent to a crushing amount of external pressure, by resuming a pre-crush configuration.

11. The article of claim 10, wherein the material has spring-like properties or is a thermal memory material.

12. The article of claim 1, wherein the bias component is undulate.

13. The article of claim 1, wherein the bias component includes a plurality of ridges and furrows.

14. The article of claim 13, wherein the plurality of ridges and furrows generate a spring-like outward force that pushes the wicking component into contact separator at a plurality of contact points.

15. A system, comprising:
an ionically conductive, electrically insulative separator having an inner surface defining a volume, and the volume is configured to receive liquid electrolyte at a determined state of charge;
a wicking component in capillary contact with the separator inner surface such that a capillary gap is defined between a surface of a wicking component and at least a portion of the inner surface of the separator;
a bias component configured to urge the wicking component against the separator inner surface at a plurality of contact points with a determined amount of force such that the capillary gap is obtained and maintained at a determined gap distance and with a determined gap distance uniformity; and
a current collector in contact with the bias component to support the bias component.

16. The system of claim 15, wherein the current collector is configured to displace at least a portion of the volume defined by the inner surface of the separator.

17. The system of claim 16, wherein the current collector has an inner surface that defines a space, and the current collector is responsive to an external pressure above a threshold value to change shape to decrease the space and therefore relieve the external pressure within the separator volume.

18. The system of claim 17, wherein the current collector is capable of returning automatically to a pre-changed configuration in response to a decrease in the external pressure subsequent to having changed shape.

19. The system of claim 16, wherein the current collector displaces a portion of the volume, but has an aperture disposed near a top of the current collector such that a rising column height of liquid electrolyte will, upon reaching the aperture, flow into the otherwise displaced volume.

* * * * *